US010541546B1

(12) United States Patent
Dowdy et al.

(10) Patent No.: US 10,541,546 B1
(45) Date of Patent: Jan. 21, 2020

(54) SYSTEM AND APPARATUS FOR PROVIDING POWER TO REMOTE ELECTRONIC DEVICES

(71) Applicant: Versalite Associates, LLC, San Diego, CA (US)

(72) Inventors: Randal A. Dowdy, San Diego, CA (US); Tracy J. Dowdy, San Diego, CA (US); Justin D. Pendleton, The Colony, TX (US)

(73) Assignee: VERSALITE ASSOCIATES, LLC, San Diego, CA (US)

( * ) Notice: Subject to any disclaimer, the term of this patent is extended or adjusted under 35 U.S.C. 154(b) by 68 days.

(21) Appl. No.: 15/680,566

(22) Filed: Aug. 18, 2017

Related U.S. Application Data (60) Provisional application No. 62/379,551, filed on Aug. 25, 2016.

(51) Int. Cl.
  *H02J 7/00* (2006.01)
  *H02J 50/10* (2016.01)
  *H01F 7/02* (2006.01)

(52) U.S. Cl.
  CPC .......... *H02J 7/0045* (2013.01); *H01F 7/0252* (2013.01); *H02J 7/0052* (2013.01); *H02J 50/10* (2016.02)

(58) Field of Classification Search
  CPC .. H05B 37/00; H05B 37/02; F21S 8/04; F21S 8/02; F21S 8/06; F21V 17/105; H02J 7/00; F21L 4/00

(Continued)

(56) References Cited

U.S. PATENT DOCUMENTS

| 3,786,575 A | 1/1974 | Riblett |
| 4,001,571 A | 1/1977 | Martin |

(Continued)

FOREIGN PATENT DOCUMENTS

| JP | 405190007 A | 7/1996 |
| WO | WO2006086308 | 8/2006 |

OTHER PUBLICATIONS

Fraen Srl FT3 Lens Series Brochures, Fraen Corporation, Reading, MA, Nov. 30, 2008, 6 pages.

(Continued)

*Primary Examiner* — Hal Kaplan
*Assistant Examiner* — Jagdeep S Dhillon
(74) *Attorney, Agent, or Firm* — Workman Nydegger (57) ABSTRACT

Embodiments are directed to systems and apparatuses for providing power to remote electronic devices. In one scenario, a system is provided which includes a sconce body. The sconce body includes a proximal side that allows placement adjacent to a wall, ceiling or surface, a distal side having an exterior surface, a cavity that slidably receives and encloses a removable power source, and an electronic device on or within the sconce body. The electronic device electrically connects to and is powered by the removable power source. The removable power source of the system can be slidably received within and enclosed by the cavity of the sconce body. The system also includes a wand that is attachable to and detachable from the removable power source. The wand has a specified length and is configured to provide for selective attachment of the removable power source to and removal from the sconce body.

19 Claims, 7 Drawing Sheets

(58) Field of Classification Search
USPC .... 307/66, 112, 104, 116, 149, 117; 315/34; 320/107, 109, 108, 103; 362/186, 188
See application file for complete search history.

(56) References Cited

U.S. PATENT DOCUMENTS

| | | | |
|---|---|---|---|
| 4,220,981 A | 9/1980 | Koether | |
| 4,682,078 A | 7/1987 | Pascalide | |
| 4,712,167 A | 12/1987 | Gordin | |
| 4,841,278 A | 6/1989 | Tezuka | |
| 5,003,432 A | 3/1991 | Mandy | |
| 5,165,783 A | 11/1992 | Barron, Sr. | |
| 5,526,245 A | 6/1996 | Davis | |
| 5,617,079 A | 4/1997 | Harrison et al. | |
| 5,743,635 A | 4/1998 | Hulse et al. | |
| 5,772,309 A | 6/1998 | Groben | |
| 5,934,787 A | 8/1999 | Sharma | |
| 5,946,637 A | 8/1999 | Umbach et al. | |
| 6,140,934 A | 10/2000 | Lam | |
| 6,260,985 B1 | 7/2001 | Zeller | |
| 6,364,510 B1 | 4/2002 | Bernhart | |
| 6,479,965 B2 | 11/2002 | Barbeau et al. | |
| 6,573,683 B2 | 6/2003 | Chang | |
| 6,604,842 B2 | 8/2003 | Griffiths | |
| 6,652,115 B2 | 11/2003 | Sharrah | |
| 6,744,223 B2 | 6/2004 | Laflamme | |
| 6,798,167 B1 | 9/2004 | Canino et al. | |
| 6,859,146 B2 | 2/2005 | McGreal et al. | |
| 6,953,260 B1 | 10/2005 | Allen | |
| 7,011,435 B1 | 2/2006 | Blaymore | |
| 7,021,787 B1 | 4/2006 | Kuelbs | |
| 7,027,736 B1 | 4/2006 | Mier-Langner | |
| 7,241,023 B1 | 7/2007 | Carpenter | |
| 7,604,370 B2 | 10/2009 | Dowdy et al. | |
| 7,772,801 B2 | 8/2010 | Dowdy et al. | |
| 8,033,686 B2* | 10/2011 | Recker | H05B 33/0803 362/249.02 |
| 8,080,819 B2* | 12/2011 | Mueller | F21K 9/00 257/13 |
| 8,358,101 B2 | 1/2013 | Dowdy et al. | |
| 9,066,393 B2* | 6/2015 | Recker | H05B 33/0815 |
| 9,133,994 B2 | 9/2015 | Dowdy et al. | |
| 9,272,058 B1* | 3/2016 | Montgomery | A61L 2/0047 |
| 2005/0243549 A1 | 11/2005 | Ruston | |
| 2006/0176689 A1 | 8/2006 | Dowdy | |
| 2006/0285328 A1* | 12/2006 | Syribeys | A61C 19/004 362/257 |
| 2007/0005071 A1* | 1/2007 | Kucklick | A61B 17/0642 606/76 |
| 2009/0154148 A1* | 6/2009 | Meyer | F21L 2/00 362/157 |
| 2013/0333197 A1 | 12/2013 | Schulte et al. | |
| 2015/0130621 A1 | 5/2015 | Seiler et al. | |
| 2016/0175896 A1* | 6/2016 | Montgomery | B08B 7/0057 250/454.11 |

OTHER PUBLICATIONS

Market Analysis Report, LJM Associates, Manhattan Beach, CA, May 5, 2005, pp. 5-8.
Luxeon Technical Data Sheet DS47, Lumileds Lighting, US, LLC, San Jose, CA, Sep. 19, 2004, 12 pages.
International Search Report, PCT/US2006/04110 dated Jan. 28, 2008.

* cited by examiner

SYSTEM AND APPARATUS FOR PROVIDING POWER TO REMOTE ELECTRONIC DEVICES

CROSS REFERENCE TO RELATED APPLICATION

This Application claims the benefit of U.S. Provisional Patent Application No. 62/379,551, filed Aug. 25, 2016, the disclosure of which is incorporated by reference.

BACKGROUND

Many people install electronic devices in their homes, such as lights, thermostats, smoke alarms, security systems and other electronic devices. In most cases, these devices are powered using conventional electrical wiring which provides alternating current to the devices. However, in some cases, the electronic devices are powered using batteries or other forms of stored energy. In such cases, the batteries wear out over time and will need to be replaced. These electronic devices may be located in easy-to-reach places, or in very hard-to-reach places. In cases where the electronic devices are placed in areas that are hard to reach, the homeowner may be less likely to use the device, and may allow it to sit, unpowered, for an extended period of time.

BRIEF SUMMARY

Embodiments described herein are directed to systems and apparatuses for providing power to remote electronic devices. In one embodiment, a system is provided which includes a sconce body. The sconce body includes a proximal side that allows placement adjacent to a wall, ceiling or surface, a distal side having an exterior surface, a cavity that slidably receives and encloses a removable power source, and an electronic device on or within the sconce body. The electronic device electrically connects to and is powered by the removable power source. The removable power source of the system can be slidably received within and enclosed by the cavity of the sconce body. The system also includes a wand that is attachable to and detachable from the removable power source. The wand has a specified length and is configured to provide for selective attachment of the removable power source to and removal from the sconce body.

In another embodiment, an apparatus is described for providing power to a remote electronic device. The apparatus includes a wand that has a wand cradle affixed to an end of the wand. The wand cradle includes a cradle base with a protruding portion, where the protruding portion aligns with a concavity of a power source. The wand cradle also includes side arms for securing the power source on the wand cradle, as well as magnets embedded in the cradle base that magnetically bind to a ferromagnetic portion of the power source. The power source provides power to a remote electronic device of the system that is accessible using the wand.

The power source has a concavity corresponding to the protruding portion of the cradle base. As such, the concavity is matable with the protruding portion to provide a mechanical connection between the wand cradle and the power source. The system also includes an electronic device that includes a proximal side that allows for placement of the electronic device adjacent to a wall, ceiling or surface. The electronic device also has a distal side with an exterior surface, as well as a cavity or flange that slidably receives and supports the power source.

In yet another embodiment, a system is described for providing power to a remote electronic device. The system includes a sconce body for housing a remote electronic device, where the sconce body includes a cavity into which a power source is inserted. The system next includes a power source with a magnet and a ferromagnetic portion. The power source is configured for insertion into the cavity of the sconce body of the remote electronic device. The magnet and the ferromagnetic portion of the power source are configured to magnetically secure the power source to the remote electronic device. The system also includes a wand having a wand cradle having side arms that secure the power source on the wand cradle. The wand cradle has a magnet and a ferromagnetic portion, which are configured to secure the power source to the wand until the wand cradle is detached from the power source.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to systems and apparatuses for providing power to remote electronic devices. In one embodiment, a system is provided which includes a sconce body. The sconce body includes a proximal side that allows placement adjacent to a wall, ceiling or surface, a distal side having an exterior surface, a cavity that slidably receives and encloses a removable power source, and an electronic device on or within the sconce body. The electronic device electrically connects to and is powered by the removable power source. The removable power source of the system can be slidably received within and enclosed by the cavity of the sconce body. The system also includes a wand that is attachable to and detachable from the removable power source. The wand has a specified length and is configured to provide for selective attachment of the removable power source to and removal from the sconce body.

In another embodiment, an apparatus is described for providing power to a remote electronic device. The apparatus includes a wand that has a wand cradle affixed to an end of the wand. The wand cradle includes a cradle base with a protruding portion, where the protruding portion aligns with a concavity of a power source. The wand cradle also includes side arms for securing the power source on the wand cradle, as well as magnets embedded in the cradle base that magnetically bind to a ferromagnetic portion of the power source. The power source provides power to a remote electronic device of the system that is accessible using the wand.

The power source has a concavity corresponding to the protruding portion of the cradle base. As such, the concavity is matable with the protruding portion to provide a mechanical connection between the wand cradle and the power source. The system also includes an electronic device that includes a proximal side that allows for placement of the electronic device adjacent to a wall, ceiling or surface. The electronic device also has a distal side with an exterior surface, as well as a cavity or flange that slidably receives and supports the power source.

In another embodiment, a system is described for providing power to a remote electronic device. The system includes a sconce body for housing a remote electronic device, where the sconce body includes a cavity into which a power source is inserted. The system next includes a power source with a magnet and a ferromagnetic portion. The power source is configured for insertion into the cavity of the sconce body of the remote electronic device. The magnet and the ferromagnetic portion of the power source are configured to magnetically secure the power source to the remote electronic device. The system also includes a wand having a wand cradle having side arms that secure the power source on the wand cradle. The wand cradle has a magnet and a ferromagnetic portion, which are configured to secure the power source to the wand until the wand cradle is detached from the power source.

Figure 1A:
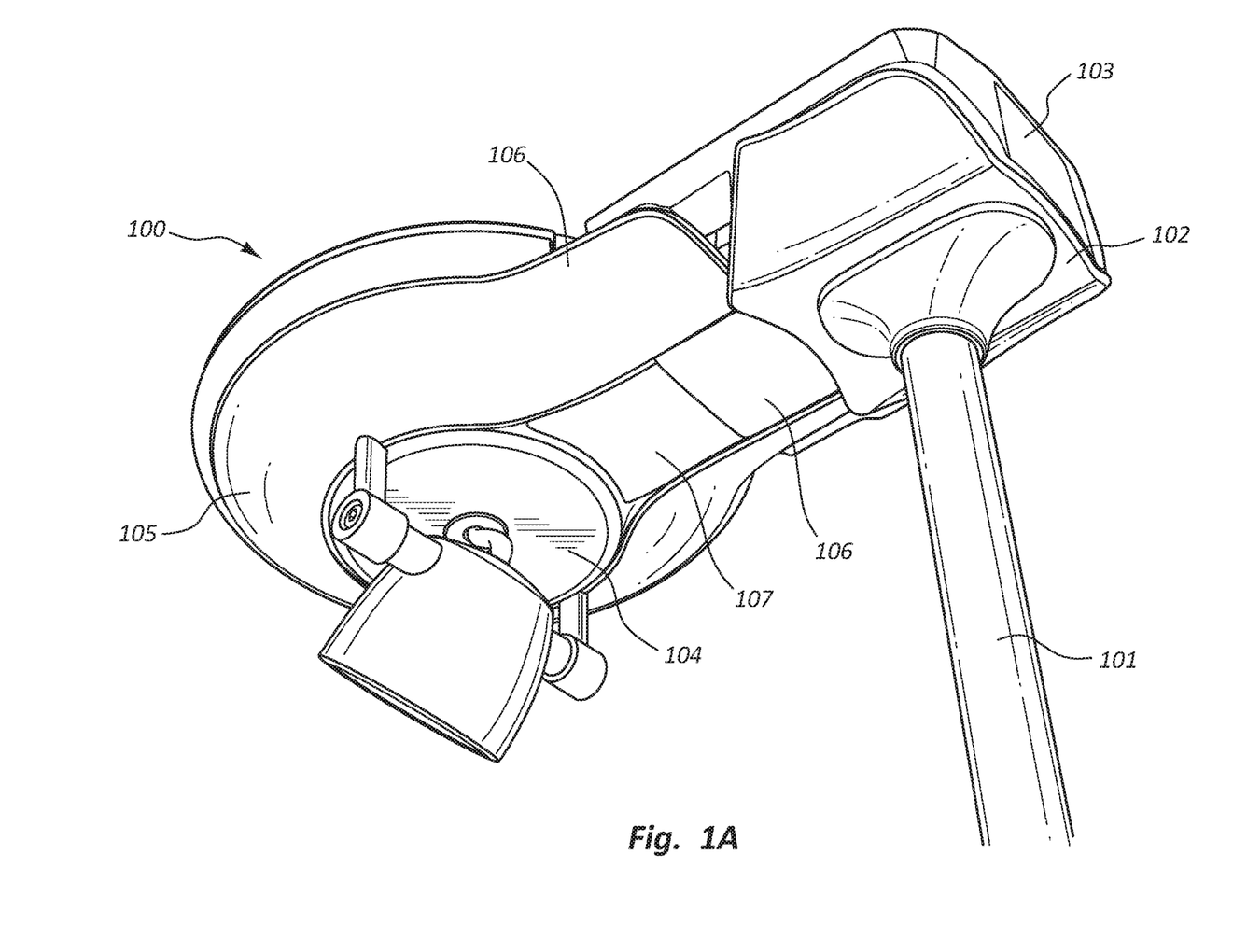
FIGS. 1A-1C illustrate a system and apparatus for providing power to a remote electronic device.

As shown in FIG. 1A, a system 100 is illustrated as having a wand 101 with a cradle 102 for use in attaching a power source 103 to an electronic device 104. Although FIG. 1A illustrates the electronic device 104 as being a lighting device, one skilled in the art will understand that the device can be substantially any type of electronic device, such as a smoke detector, a carbon dioxide detector, a heat detector, a motion detector, a glass breakage detector, a leak sensor, a range extender, a dimmer, a solenoid, a device controller, a device bridge, an alert module, an indoor or outdoor security camera, a receiver, a transmitter, an energy monitoring device, a listening device, or some other type of device. The power source 103 may be a battery, a capacitor, a super capacitor, or an AC power source, such as a wall outlet connected via a power cord.

The power source 103 may be placed within a sconce body 105 of the system 100. The sconce body 105 may be of substantially any shape or size that can accommodate the receiving of a power source. In the embodiment shown in FIG. 1A, the power source 103 is slidably received on the side of the sconce body 105. The sconce body 105 may include side arms 106 that are configured to receive the power source 103 and also secure it in place. For instance, in cases where the system 100 is arranged on a ceiling, the sconce body may be affixed directly to the ceiling or to the electronic device 104 which itself is affixed to the ceiling. The side arms 106 of the sconce body thus secure the power source 103 to the system 100 and/or against the ceiling. In other implementations, the system 100 may be arranged on a wall or in some other location. The sconce body can include a cavity 107 or other sufficient structure to receive the power source 103 and hold it in place.

The system 100 also includes a wand 101 for assisting in placement of power source 103 at a remove location. As shown in FIG. 1A, the wand includes a cradle 102 that secures the power source 103 in place while it is being positioned within the sconce body 105. The wand 101 may be of substantially any length, and may be extendable or telescopic, folding or fixed-length in nature. The wand 101 allows users to access places that are out of reach for a typical person. For example, many ceiling lights are out of reach without using a chair, ladder or other device to position oneself higher. The inconvenience of using such devices typically reduces the desirability of using battery powered devices in these out-of-reach, remote locations. The wand 101, however, may be used to easily access these remote locations, and may safely provide the power source 103 to the electronic device 104 with very little effort.

The power source 103 may be the sole source of power for the electronic device 104, or it may be used to charge another power supply that is built into the electronic device 104. For instance, if the sole power source 103 is a battery, the battery may be provided to the electronic device 104 using the wand 101. The battery connects to the electronic device 104 via an electrical connection, and powers that electronic device via the electrical connection. Similarly, if the electronic device 104 includes an on-board power source (not shown), the battery may be used to charge the on-board power source.

The electronic device 104 may include a power control circuit (not shown) programmed with logic to control the charging and/or powering of the electronic device. The power control circuit may determine the power needs of the electronic device, and may regulate the flow of electricity from the power source 103 to the electronic device 104 accordingly.

In some cases, the power source 103 is a rechargeable battery. The rechargeable battery may have a higher voltage and capacity than an on-board battery, capacitor, or other power supply that is part of the electronic device 104. As such, the on-board supply may be charged using the rechargeable battery. The recharging or direct powering may be performed using direct electrical connections, or may be performed wirelessly using induction. A power control circuit (not shown) may be used to control power transfer via induction between the power source 103 and the electronic device 104 and/or a on-board power supply within the electronic device.

The power source 103 may include a battery that can be charged using a charging station (e.g., a wall mount charging brick, docking station, wall charger with DC plug or USB adaptor, AC-DC plug plugged into an electrical outlet and communicating with the battery via charging contacts located on the pole member or a DC outlet in a side of the power source body). AC power can be alternatively transferred from a standard wall outlet to the external power supply that includes a self-contained transformer (e.g., via a cord or wire passing through the wand 101). The power source 103 can be left in place on a remotely located lighting or other electronic device to extend operational time by providing an auxiliary stored power source. If an on-board battery or other power supply (e.g. capacitor or super capacitor) of the electronic device 104 is being charged, a recharging indicator light may be provided on the sconce body to indicate when the on-board power supply or capacitor has been fully charged. In some cases, the on-board power supply of the electronic device 104 may be charged by a photoelectric cell, gas powered generator, mini wind turbine, or other type of charging means.

The power source 103 can be detachably coupled to the wand 101 to provide user access to a remotely located electronic device 104. A swivel or other pivotable connection may be provided between the wand 101 and the power source 103. Such a pivotable connection allows pivoting movement of the pole relative to the power source 103 instead of a rigid connection. This allows attachment of the power source 103 to a remotely located electronic device attached to a wall, pillar or other non-horizontal surface other than a ceiling. The wand 101 can be selectively disconnected from the power source 103 to leave the power source to power the remotely located electronic device 104. The wand 101 can be disconnected as a result of a mechanical and/or magnetic connection between the wand cradle 102 and the power source 103. The wand 101 can be adjustable in length to accommodate different users and/or positions of the electronic device 104, and may have an ergonomic handle or other graspable feature.

Figure 1B:
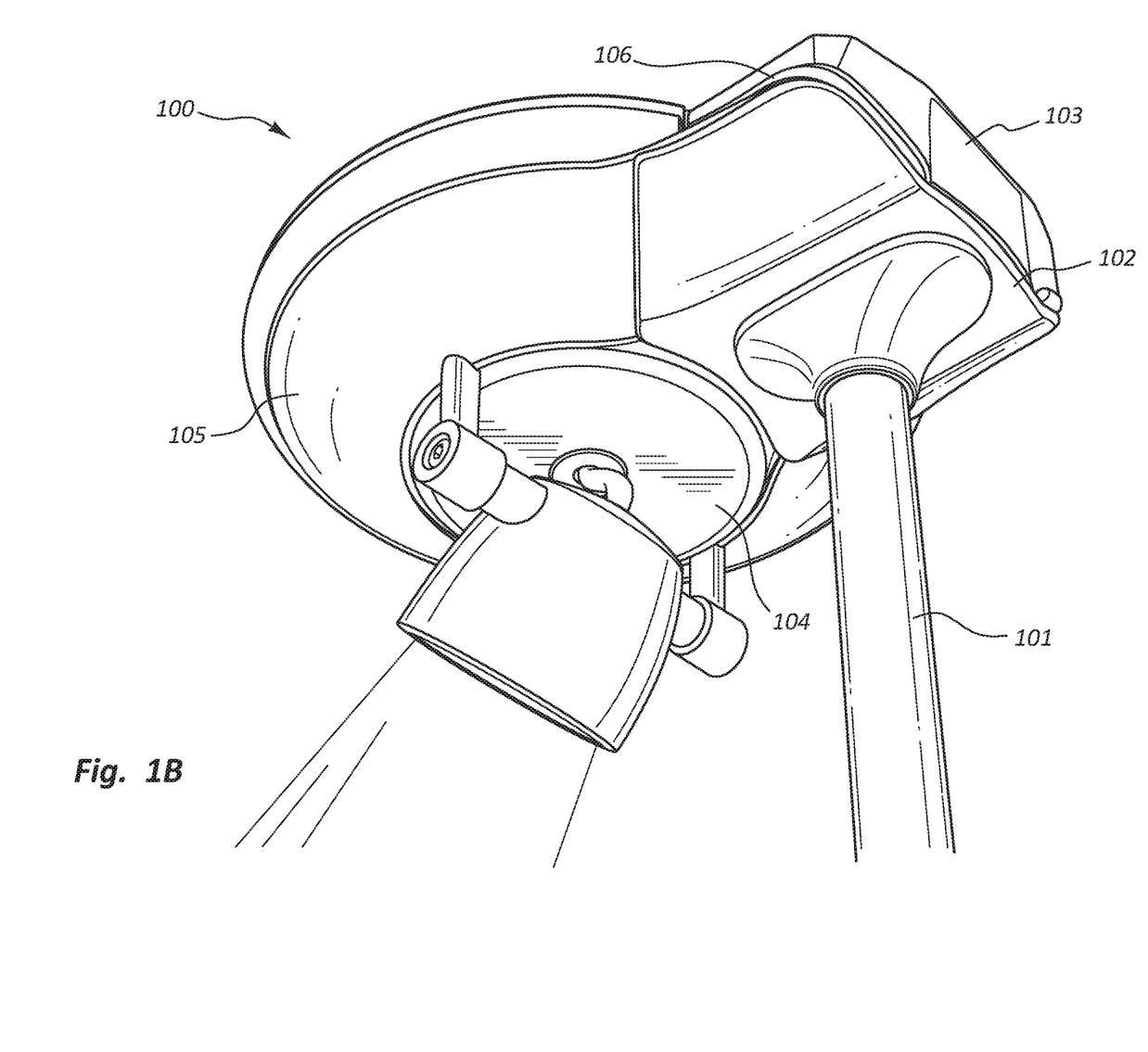

FIG. 1B illustrates an embodiment in which the power source 103 has been fully inserted into the sconce body 105 of system 100. The side arms 106 of the sconce body 105 can support the weight of the power source 103. The side arms 106 can also provide a counterforce when the wand cradle 102 is separated from the battery. As will be explained in greater detail below, the power source 103 and the wand cradle 102 may have mechanical and/or magnetic fastening means that detachably connect the power source 103 to the wand cradle 102. The mechanical and magnetic fastening means form a separable link that allows selective separation upon the application of sufficient force.

Figure 1C:
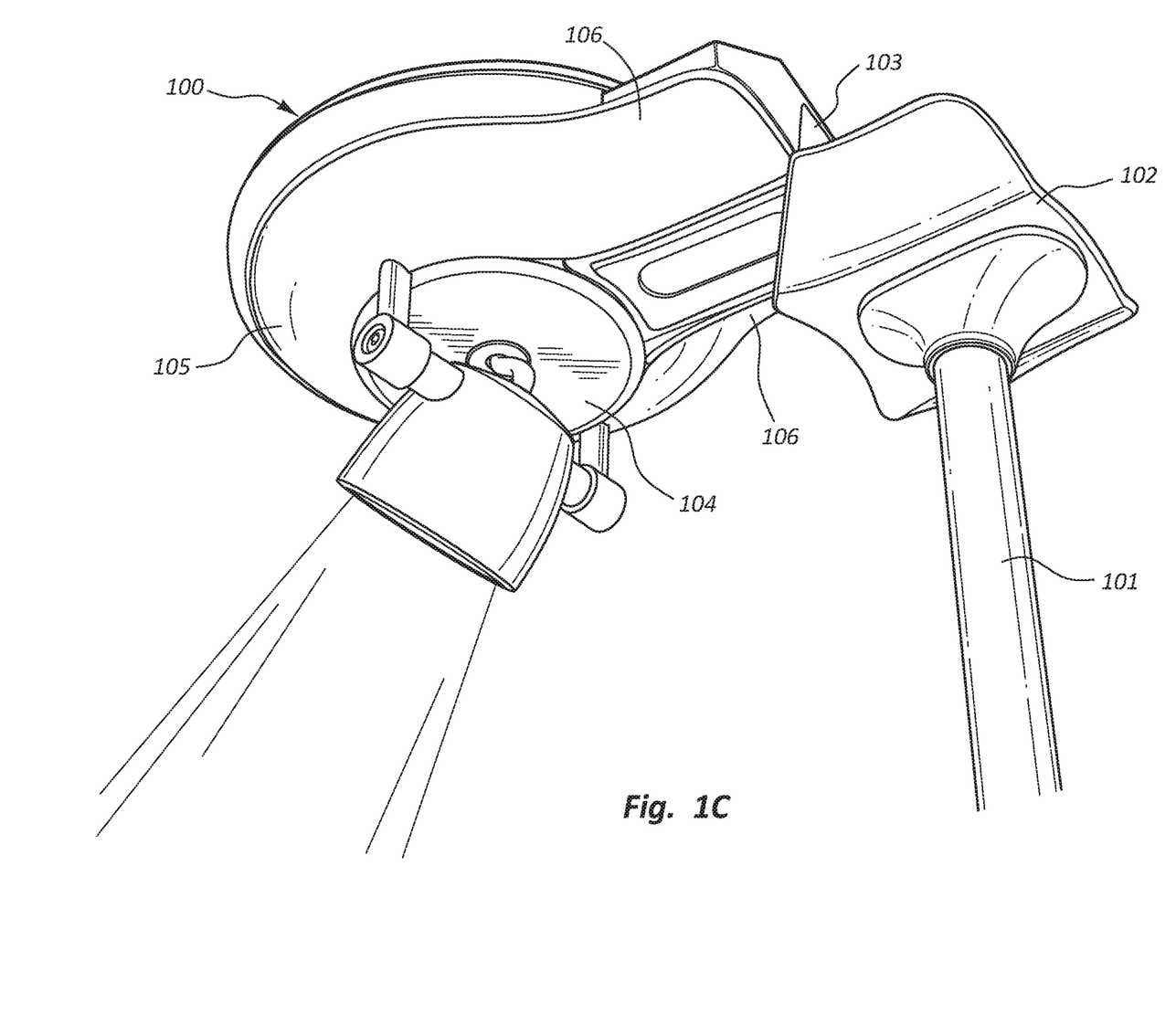

For instance, as shown in FIG. 1C, once sufficient downward force has been applied to the wand cradle 102 using the wand 101, the wand cradle is separated from the power source 103. In this manner, a user can place a power source 103 in a wand cradle 102, raise the wand cradle to the sconce body 105 using the wand 101, place the power source 103 on or in the side arms 106 and slide the power source into place, such that it is in wired or wireless electrical contact with the electronic device 104, and, with downward torqueing, twisting or other force, remove the wand 101 and cradle 102 from the power source 103.

The system 100 may thus be used to access and provide power to remote electronic devices. In one embodiment, the system 100 includes at least the following components: a sconce body 105 including a proximal side configured for placement adjacent to a wall, ceiling or surface, a distal side comprising an exterior surface, and a cavity 107 configured to slidably receive and at least partially enclose a removable power source 103. The system 100 further includes an electronic device 104 on or within the sconce body 105. The electronic device 104 is configured to electrically connect to and be at least partially powered by the removable power source. The system 100 also includes the removable power source 103, which is configured to be slidably received within and at least partially enclosed within the cavity 107 of the sconce body 105, such as by side arms 106. Still further, the system 100 includes a wand 101 and cradle 102 that are attachable to and detachable from the removable power source 103. The wand has a specified length and is configured to provide for selective attachment of the removable power source to and removal from the sconce body 105. The wand 101 may be designed to be long enough for an average person to be able to reach an electronic device on a ten foot ceiling, for example.

When the removable power source 103 is fully inserted into the cavity 107 of the sconce body 105, the power source can then power the electronic device 104. The power source 103 may be the sole power supply for the electronic device 104, or may be one of many power supplies for the electronic device, each working in tandem, or working as backups for each other. In some cases, the system 100 may include a power control circuit that governs how power is applied from the power source 103 to the electronic device 104. The removable power source 103 may provide power to a second, different power source that is electronically paired to the electronic device 104. As such, the removable power source can then charge the second power source or act as a backup power supply. As mentioned previously, the power source 103 may be substantially any type of device capable of storing energy including a battery, a capacitor, a super capacitor, or other type of energy store.

The power control circuit may be part of the electronic device 104, or may be a separate component. The power control circuit may be programmed to regulate the transfer of power from the removable power source 103 to the electronic device. In some cases, for instance, the power control circuit may determine that the electronic device 104 has an on-board power supply that is dead or has very little remaining energy. Once the removable power source 103 is attached, the power control circuit may begin the transfer of electricity from the power source 103 to the on-board power supply. In some embodiments, the removable power source 103 may be an electrically powered charging apparatus that is plugged in to a power outlet. Such a powered charging apparatus may be left attached to the electronic device 104 to quick-charge an onboard power source. Charging may also be performed using induction, such that electricity is induced from the battery or other power source and is transferred wirelessly to the onboard power source or capacitors of the electronic device 104.

The electronic device 104 may be any type of electrical device commonly found in a home, business or other place. In some cases, the electronic device 104 is an indoor or outdoor light. As such, the power source 103 can power the light for a period of time until the stored power runs out. In other cases, the electronic device 104 may be a smoke detector, a CO2 detector, a heat detector, a motion detector, a window monitor, a range extender, a dimmer, a solenoid, a device controller, a device bridge, an alert module, an indoor or outdoor security camera, a receiver, a transmitter, an energy monitoring device, a listening device, or any other type of electronic device that can be installed on a surface.

The sconce body 105 may be formed around, on or in the electronic device 104. In some cases, as shown in FIGS. 1A-1C, the sconce body is substantially U-shaped. The U-shape provides two side arms 106 that support the power source 103. The side arms may be configured to aid in the placement of the power source within the sconce body 105. For instance, the sconce body may provide curved edges or a wider opening that ultimately narrows into the cavity 107. The wand cradle 102 may also be designed to assist in properly placing the power source into the cavity 107 of sconce body 105. For example, the wand cradle 102 may have a small, triangle tip that may be used as a guide when visibility is low (e.g., in places with limited lighting and or at distances greater than 20 feet). Other embodiments may have a long cylindrical shape with a tip that can be used to guide the wand cradle into place.

Once the power source 103 is in place, a magnetic locking feature may secure it to the electronic device 104, apart from or in addition to a mechanical connection. Indeed, the removable power source 103 may be magnetically and separably attached to the wand, and may be magnetically and separably attached to the electronic device 104. The removable power source 103, the electronic device 104 and the wand 101 may each have at least one magnet to provide this magnetic locking feature. Additionally or alternatively, the power source, the electronic device and/or the wand may have corresponding ferromagnetic materials (e.g. steel) to which the magnets may attach. The magnets may thus attach to ferromagnetic materials or to other magnets of opposite polarity. These concepts will be described further below with regard to FIGS. 2-5, in conjunction with FIG. 1A.

Figure 2:
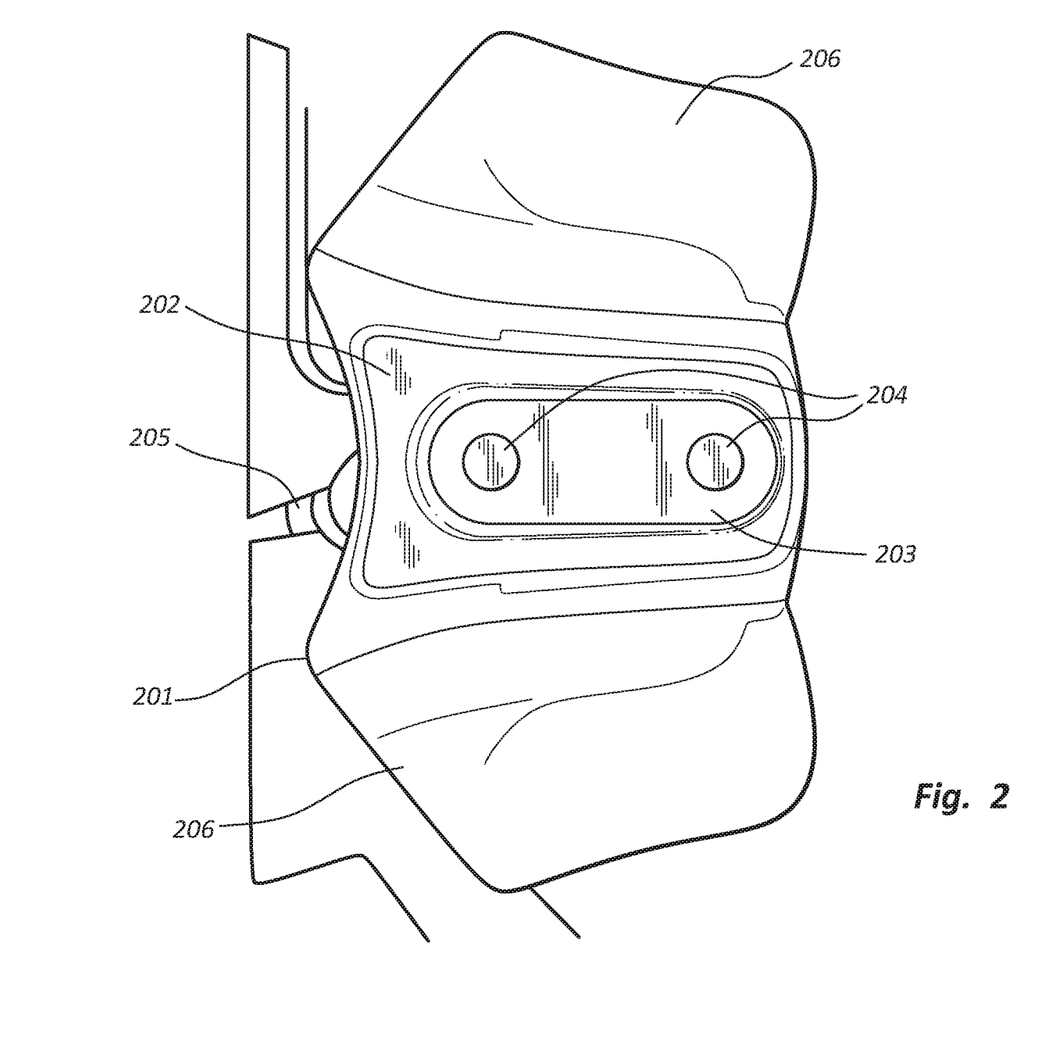
FIG. 2 illustrates a top view of a wand cradle and wand.

In one embodiment, an apparatus is provided that provides power to a remote electronic device (e.g., 104). As illustrated in FIG. 2, the apparatus includes a wand 205 having a wand cradle 201 affixed to an end of the wand. The wand cradle 201 includes a cradle base 202 with a protruding portion 203. The protruding portion 203 has a shape so as to be configured to align with a concavity of a power source, such as a concavity 302 of a power source 301 illustrated in FIG. 3. Returning to FIG. 2, the wand cradle 201 has side arms 206 configured to secure the power source 301 (FIG. 3) on the wand cradle 201, and one or more magnets 204 embedded in the cradle base that magnetically bind to at least one ferromagnetic portion of the power source 301.

Figure 3:
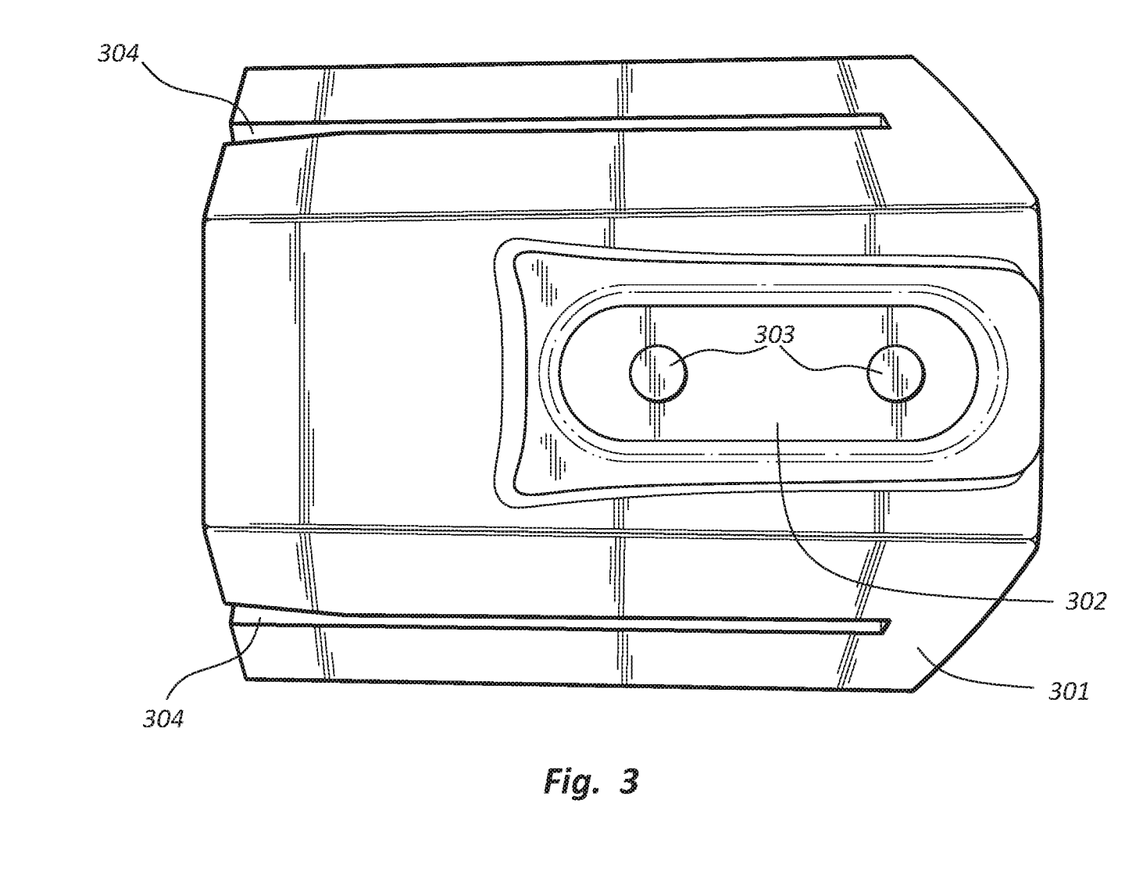
FIG. 3 illustrates a bottom view of a power source.

As shown in FIG. 3. the apparatus also includes a power source 301 configured to provide power to a remote electronic device 104 that is accessible using the wand 205. The power source has a concavity 302 that is complementary to the shape of the protruding portion 203 of the cradle base 201. The concavity 302 is matable with the protruding portion 203 to provide a mechanical connection between the wand cradle 201 and the power source 301. The apparatus also includes an electronic device 104 that includes a proximal side that allows for placement of the electronic device adjacent to a wall, ceiling or surface, a distal side with an exterior surface, and at least one of a cavity 107 or flange that slidably receives and supports the power source 301. In some cases, the power source may have an electrically charged tip or other connector that may connect with the remote electronic device (e.g. via capacitor or AC hardwire connection) that can charge removable (or non-removable) power sources on the electronic device. In such cases, the power source on the wand may be detachable but may not detach from the wand or the wand cradle, and may charge the other power sources while connected to the wand.

As can be seen in FIG. 2, the wand cradle 201 includes a protruding portion 203 with magnets 204 embedded therein. These magnets may be of opposite polarity to the magnets 303 in the power source 301. The protruding portion 203 of the wand cradle 201 thus can be inserted into the concavity 302, thereby mechanically mating the wand cradle 201 and the power source 301. The magnets 204 of the wand cradle 201 may align with the magnets 303 of the power source 301. The magnets are of opposite polarity, such that they will be attracted to each other. In place of magnets, a ferromagnetic material may be embedded in either the wand cradle or the power source. Thus, different combinations of magnets and ferromagnetic materials may be used to create the magnetic binding. Furthermore, it will be understood that substantially any number or size or arrangement of magnets and/or ferromagnetic materials may be used on either the wand cradle 201 or the power source 301. The power source 301 may also have grooves or guides 304 that facilitate proper placement within the cavity 107 of the sconce body 105.

Figure 4:
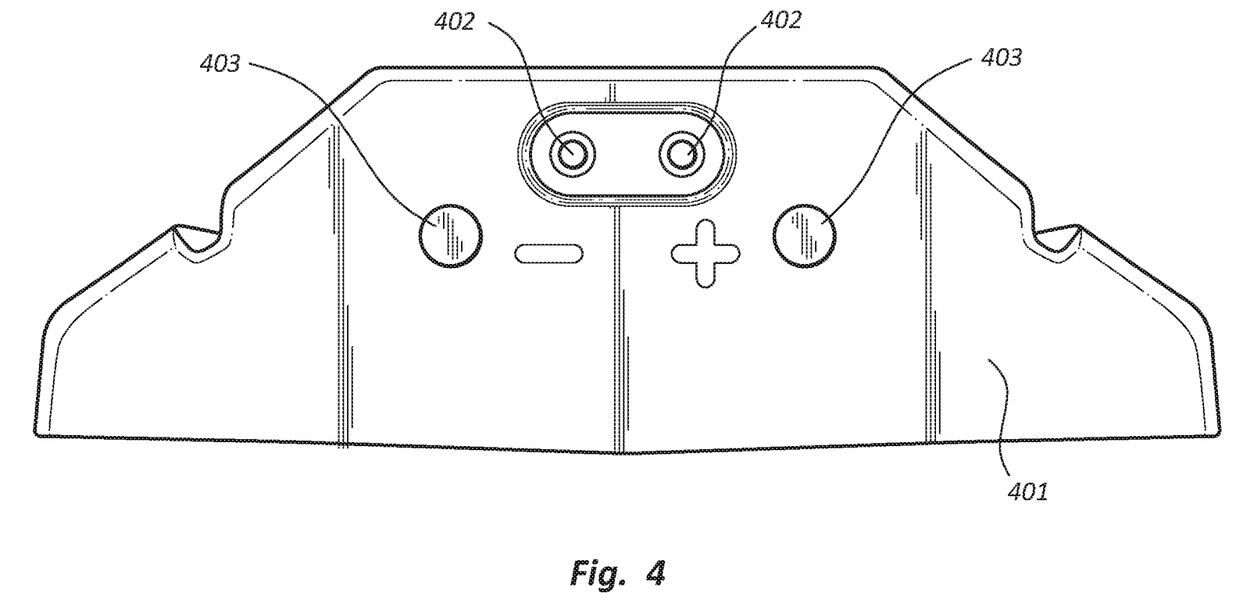
FIG. 4 illustrates a side view of a power source with its corresponding electrical connectors.
Figure 5:
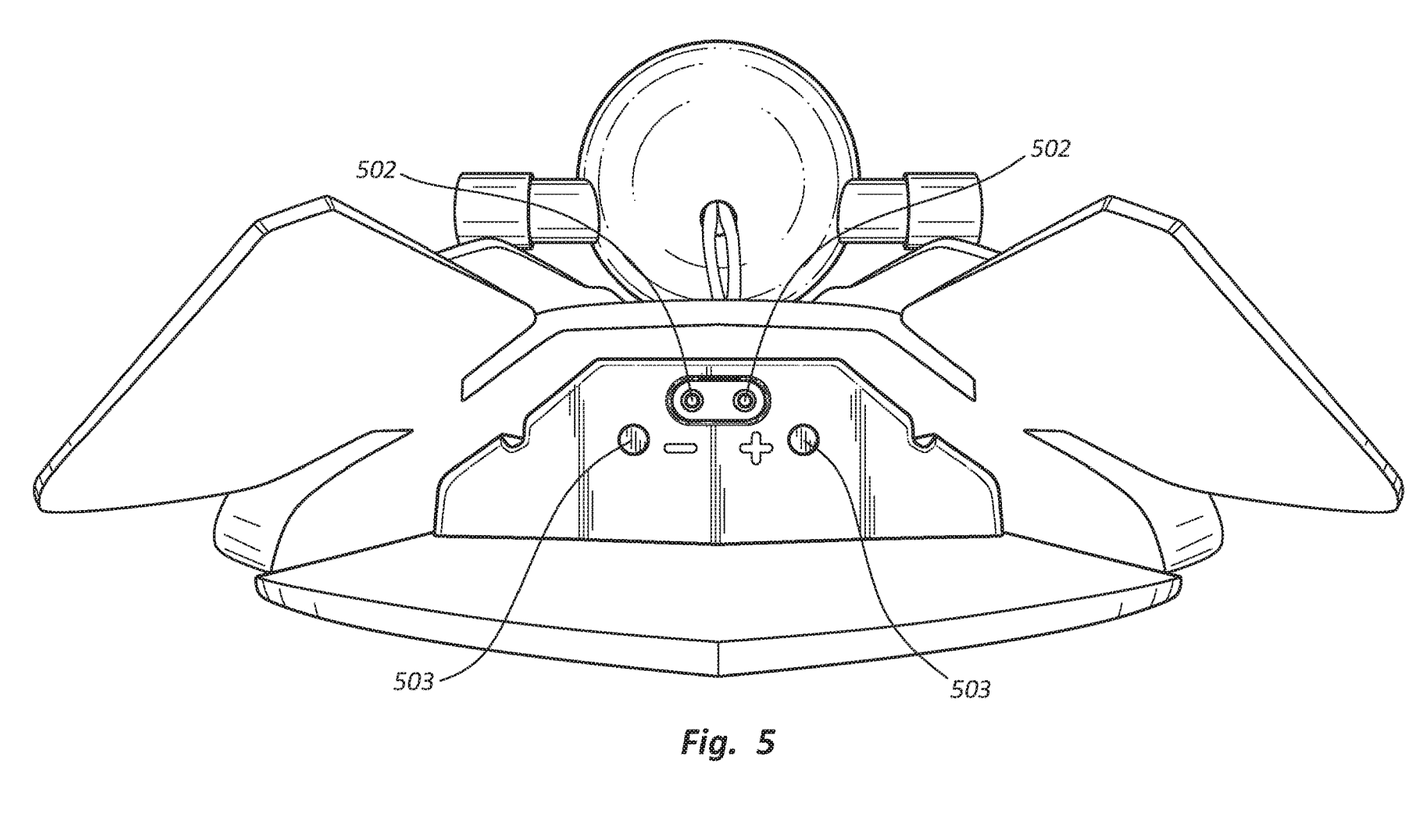
FIG. 5 illustrates a side view of an electronic device including a cavity into which a power source is placed.

As shown in FIG. 4, the power source 401 may include one or more electrical contacts 402 (e.g. Pogo pins) that connect to corresponding electrical contacts of the electronic device (shown in FIG. 5). In addition to the magnets 303 holding the power source 301 to the wand cradle 201, the power source may also include at least one embedded magnet 403 that is magnetically attracted to a magnet or a ferromagnetic portion of the electronic device. Indeed, like the wand cradle and power source connection, the power source may also be magnetically connected to the electronic device. This magnetic connection secures the power source to the electronic device 104, and keeps the power source connected to the electronic device even when a counterforce is applied by a wand to separate the power source from the wand cradle. Once the power source is connected to the electronic device, the power source can transfer electricity via a wired connection or wirelessly using a wireless power transfer means such as induction.

Embodiments described herein may also include a system for providing power to a remote electronic device. The system includes a sconce body 105 for housing a remote electronic device 104. The sconce body includes a cavity 107 into which a power source 103 is inserted. The power source includes at least one magnet and at least one ferromagnetic portion. The power source is configured for insertion into the cavity 107 of the sconce body 105 of the remote electronic device 104. The magnet and the ferromagnetic portion of the power source are thus configured to magnetically secure the power source to the remote electronic device. As can be seen in FIG. 5, magnets 501 in the sconce body may be configured to align with the magnets 403 of the power source. The electrical connectors (e.g., Pogo pins) 502 of the electronic device also align with the electrical connectors 402 of the power supply. Thus, the magnets 501 of the electronic device and the magnets 403 of the power source firmly hold the power source to the electronic device, and ensure that the corresponding electrical connectors 402 and 502 remain connected.

The apparatus also includes a wand with a wand cradle. The wand cradle 201 of FIG. 2 has side arms 206 that secure the power source on the wand cradle. The wand cradle also has at least one magnet and at least one ferromagnetic portion, which are configured to secure the power source to the wand until the wand cradle is detached from the power source (as illustrated in FIG. 1C). As can be seen in FIGS. 2-4, two sets of magnet-to-magnet or magnet-to-ferromagnetic connections exist in the apparatus: a wand-cradle-to-power-source connection and a power-source-to-electronic-device connection. Each of these connections may be of a different strength, where the strength is sufficient to secure the elements together, but still allow separation when sufficient force is applied. Accordingly, different sizes and shapes of magnets may be used, depending on the size or weight of the power supply, and how the apparatus is mounted.

In general, the magnets of each of these connections will connect to another magnet of opposite polarity, or will connect to a portion of ferromagnetic material that is placed opposite the magnet. In the illustrated embodiments, the wand-cradle-to-power-source connection, the wand cradle and the power source each have two magnets. In the power-source-to-electronic-device connection, the power source and the electronic device each have two magnets as well. It will be understood that the use of four total magnets for each connection was chosen arbitrarily, and that substantially any number of magnets may be used for each connection. In addition to the magnetic connections, the wand cradle may also include a protrusion that fits into a corresponding concavity on the power source. As such, the wand cradle mechanically mates with the concavity of the power source, providing a mechanical connection in addition to the magnetic connection created by the wand cradle magnets.

Accordingly, systems and apparatuses are provided which provide power to a remote electronic device. These systems and apparatuses may take a variety of different forms, and may include various different connections including mechanical connections and magnetic connections. The systems and apparatuses provide a wand which allows users to reach remote electronic devices that would otherwise be unreachable or at least difficult to reach. Using such a wand, a user can easily remove a power source from an electronic device, and replace it with a new power source. This power source may provide the sole power supply for the electronic device, or may simply charge an onboard power source that is already part of the electronic device. In this manner, replacement of power sources in remote location is made safer and easier for users.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A system for providing power to a remote electronic device, comprising:
    a sconce body including:
        a proximal side configured for placement adjacent to a wall, ceiling or surface;
        a distal side comprising an exterior surface;
        a cavity configured to slidably receive and at least partially enclose a removable power source; and
        an electronic device on or within the sconce body, wherein the electronic device is configured to electrically connect to and be at least partially powered by the removable power source;
    the removable power source, wherein the power source is configured to be slidably received within and at least partially enclosed by the cavity of the sconce body; and
    a wand that is attachable to or detachable from the removable power source, the wand having a specified length and being configured to provide for selective attachment of the removable power source to and removal from the sconce body,
    wherein the removable power source is magnetically and separably attached to the wand, the removable power source and the wand each having at least one magnet.

2. The system of claim 1, wherein the removable power source is the sole power supply for the electronic device.

3. The system of claim 1, wherein the removable power source provides power to a second, different power source that is electronically paired to the electronic device, such that the removable power source charges the second power source.

4. The system of claim 1, wherein the removable power source comprises at least one of a battery, a capacitor or a super capacitor.

5. The system of claim 1, wherein electronic device comprises at least one of the following: an indoor or outdoor light, a smoke detector, a carbon dioxide detector, a heat detector, a motion detector, a glass breakage detector, a leak sensor, a range extender, a dimmer, a solenoid, a device controller, a device bridge, an alert module, an indoor or outdoor security camera, a receiver, a transmitter, an energy monitoring device, a listening device or a mountable electronic device.

6. The system of claim 1, further comprising a power control circuit configured to regulate the transfer of power from the removable power source to the electronic device.

7. The system of claim 1, wherein the wand comprises a fixed-length wand, a telescopic wand or a folding wand.

8. The system of claim 1, wherein the removable power source comprises an electrically powered charging apparatus that is plugged in to an power outlet.

9. The system of claim 1, wherein the sconce body is U-shaped.

10. An apparatus for providing power to a remote electronic device, comprising:
    a wand having a wand cradle affixed to an end of the wand, the wand cradle including:
        a cradle base with a protruding portion, the protruding portion being configured to align with a concavity of a power source;
        one or more side arms configured to secure the power source on the wand cradle; and
        one or more magnets embedded in the cradle base that magnetically bind to at least one ferromagnetic portion of the power source;
    the power source configured to provide power to a remote electronic device that is accessible using the wand, the power source having a concavity corresponding to the protruding portion of the cradle base, wherein the concavity is matable with the protruding portion to provide a mechanical connection between the wand cradle and the power source; and
    an electronic device that includes a proximal side that allows for placement of the electronic device adjacent to a wall, ceiling or surface, a distal side with an exterior surface, and at least one of a cavity or flange that slidably receives and supports the power source.

11. The apparatus of claim 10, wherein the power source comprises one or more electrical contacts that connect to one or more corresponding electrical contacts of the electronic device.

12. The apparatus of claim 10, wherein the power source wirelessly connects to the electronic device to provide power using induction.

13. The apparatus of claim 10, wherein the power source includes at least one magnet embedded therein that magnetically binds to at least one ferromagnetic portion of the wand.

14. A system for providing power to a remote electronic device, the system comprising:
    a sconce body for housing a remote electronic device, the sconce body including a cavity into which a power source is inserted;
    a power source comprising at least one magnet and at least one ferromagnetic portion, the power source being configured for insertion into the cavity of the sconce body of the remote electronic device, the at least one magnet and the at least one ferromagnetic portion of the power source being configured to magnetically secure the power source to the remote electronic device; and a wand having a wand cradle comprising side arms that secure the power source on the wand cradle, the wand cradle further comprising at least one magnet and at least one ferromagnetic portion, the at least one magnet and the at least one ferromagnetic portion of the wand being configured to secure the power source to the wand until the wand cradle is detached from the power source.

15. The system of claim 14, wherein the remote electronic device has at least one magnet arranged in a specified polarity that is opposite the polarity of the power source's magnet.

16. The system of claim 14, wherein the power source has a second magnet, such that the at least one magnet magnetically binds the power source to the remote electronic device, and the second magnet magnetically binds the power source to the wand, wherein the magnets of the power source are each arranged in a specified polarity that is opposite the polarity of the remote electronic device's magnet and the wand's magnet.

17. The system of claim 14, wherein the wand cradle further includes a protrusion, and wherein the power source includes a concavity, such that the wand cradle mechanically mates with the concavity of the power source, providing a mechanical connection in addition to a magnetic connection created by the wand cradle magnet.

18. The system of claim 14, wherein the removable power source further comprises an AC or DC power input port for delivering AC or DC power from an external power supply in order to recharge the removable power source.

19. The system of claim 14, further comprising a second removable power supply selectively attachable to and detachable from the electronic device for providing alternative or additional electrical power to the electronic device when the first removable power source is discharged or not present.

* * * * *